(12) United States Patent  (10) Patent No.: US 7,523,985 B2
Bhatia et al.  (45) Date of Patent: Apr. 28, 2009

(54) SEAT ASSEMBLY HAVING INTEGRATED BELT, STORAGE COMPARTMENTS AND REGISTERS

(75) Inventors: Vikas Bhatia, Canton, MI (US); Hamshivraj Singh Dhamrat, Ypsilanti, MI (US); Robert Christopher Day, Whitmore Lake, MI (US); Masroor Fahim, Canton, MI (US); Bill Deming, Fenton, MI (US); Michael Anthony Zielinski, Novi, MI (US); George Mike Chalhoub, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 24 days.

(21) Appl. No.: 11/565,774

(22) Filed: Dec. 1, 2006

(65) Prior Publication Data

US 2007/0182230 A1 Aug. 9, 2007

Related U.S. Application Data

(60) Provisional application No. 60/765,690, filed on Feb. 6, 2006.

(51) Int. Cl.
*A47C 7/62* (2006.01)
*A47C 7/72* (2006.01)
(52) U.S. Cl. .............................. 297/188.04; 297/188.07; 297/188.1

(58) Field of Classification Search ............ 297/188.07, 297/188.04, 188.09, 180.13, 188.1
See application file for complete search history.

(56) References Cited

U.S. PATENT DOCUMENTS

| 4,431,233 | A |   | 2/1984 | Ernst |
| 4,919,488 | A |   | 4/1990 | Deegener et al. |
| 5,286,084 | A |   | 2/1994 | Bart |
| 5,390,976 | A |   | 2/1995 | Doughty et al. |
| 5,468,044 | A |   | 11/1995 | Coman |
| 5,720,514 | A |   | 2/1998 | Carlsen et al. |
| 5,788,324 | A | * | 8/1998 | Shea et al. ............. 297/188.04 |
| 6,048,034 | A |   | 4/2000 | Aumont et al. |
| 6,059,358 | A | * | 5/2000 | Demick et al. ......... 297/188.04 |
| 6,199,948 | B1 | * | 3/2001 | Bush et al. .......... 297/188.04 X |
| 6,247,751 | B1 | * | 6/2001 | Faust et al. ......... 297/180.13 X |
| 6,425,619 | B2 |   | 7/2002 | Ney |
| 6,572,171 | B1 |   | 6/2003 | Pautz et al. |
| 6,877,807 | B2 | * | 4/2005 | Mizuno et al. ...... 297/188.09 X |
| 7,300,105 | B2 | * | 11/2007 | Jasinski et al. ...... 297/188.07 X |
| 2003/0047971 | A1 |   | 3/2003 | Fohrenkamm et al. |
| 2005/0012379 | A1 |   | 1/2005 | Tame |

* cited by examiner

*Primary Examiner*—Anthony D. Barfield
(74) *Attorney, Agent, or Firm*—Gifford, Krass, Sprinkle, Anderson & Citkowski, P.C.

(57) ABSTRACT

A vehicle seat assembly includes a seat cushion and a seat back. The seat back is pivotally coupled to the seat cushion for movement between a generally upright seating position and a folded flat position overlying the seat cushion. The seat back has a front seating surface and an opposite back surface. The back surface has a console with at least one compartment with a hinged lid for storing objects therein.

2 Claims, 4 Drawing Sheets

SEAT ASSEMBLY HAVING INTEGRATED BELT, STORAGE COMPARTMENTS AND REGISTERS

CROSS REFERENCE TO RELATED APPLICATION

This application claims priority to U.S. provisional patent application No. 60/765,690, which was filed Feb. 6, 2006 and is incorporated herein by reference in its entirety.

BACKGROUND OF THE INVENTION

1. Field of the Invention

The invention relates to seat assemblies for use in automotive vehicles. More particularly, the invention relates to a seat assembly having an integrated belt restraint, storage compartments and ventilation registers 2. Description of the Related Art Automotive vehicles include seat assemblies for supporting occupants within an interior passenger compartment. It is known to provide seats with folding seat backs to increase the cargo carrying capacity of the vehicle. Yet, it remains desirable to provide improved seat designs that enhance the cargo capacity of the vehicle and remain easily actuated between stowed and use positions.

SUMMARY OF THE INVENTION

According to one aspect of the invention, a vehicle seat assembly includes a seat cushion and a seat back. The seat back is pivotally coupled to the seat cushion for movement between a generally upright seating position and a folded flat position overlying the seat cushion. The seat back has a front seating surface and an opposite back surface. The back surface has a console with at least one compartment with a hinged lid for storing objects therein.

BRIEF DESCRIPTION OF THE DRAWINGS

Advantages of the present invention will be readily appreciated as the same becomes better understood by reference to the following detailed description when considered in connection with the accompanying drawing, wherein.

DETAILED DESCRIPTION OF THE INVENTION

Figure 1:
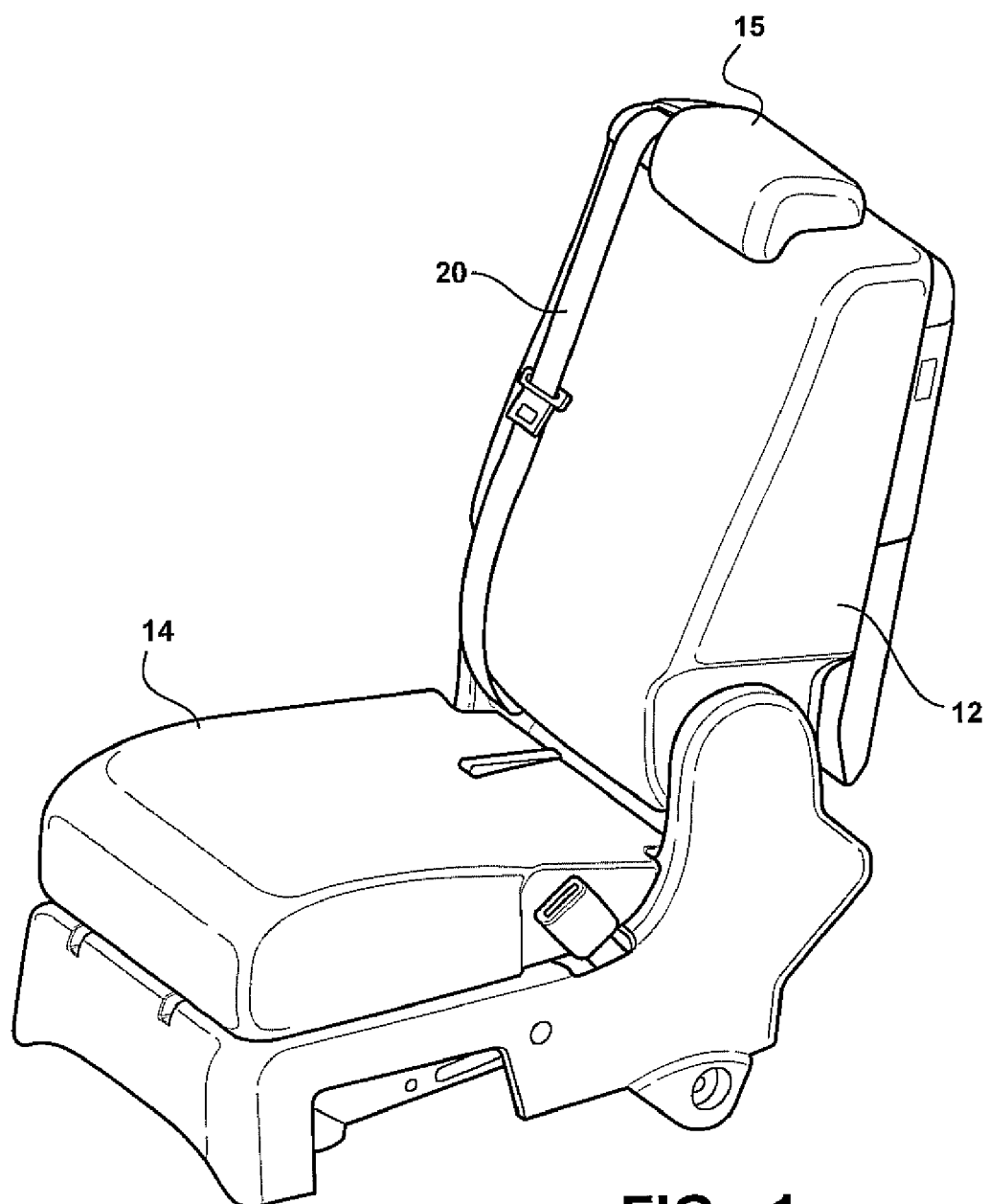
FIG. 1 is a front perspective view of a vehicle seat assembly according to one embodiment of the invention.

Referring to FIGS. 1-6, a seat assembly for an automotive vehicle is generally indicated at 10. The seat assembly 10 includes a seat back 12 and a seat cushion 14. The seat back 12 is pivotally coupled by a recliner mechanism (not shown) to the seat cushion 14 for selective movement between an upright seating position and a substantially horizontal stowed position. A head restraint 15 is also provided along a top end of the seat back 12 for supporting the head of an occupant. The head restraint 15 may be adjusted to allow adjustment of the seat back 12 to the stowed position without interfering with obstacles in front of the seat 10, such as the instrument panel, or another seat assembly. The recliner mechanism also allows selective angular adjustment of the seat back 12 relative to the seat cushion 14 among a plurality of seating positions.

The seat back 12 includes an integrated tower 16 supporting a belt retractor 18. A belt restraint 20 extends from the retractor 18 and includes an end fixedly secured to the seat cushion 14. A back side of the seat back 12 includes an integrated console 30. The console 30 includes a forward compartment 32 and a rearward compartment 34. The rearward compartment 34 extends along the width of the seat back and is disposed along a bottom edge of the seat back. Each of the compartments 32, 34 are covered by hinged lids 33, 35. A cup holder 36 is formed in the console 30 for holding beverage containers.

Figure 2:
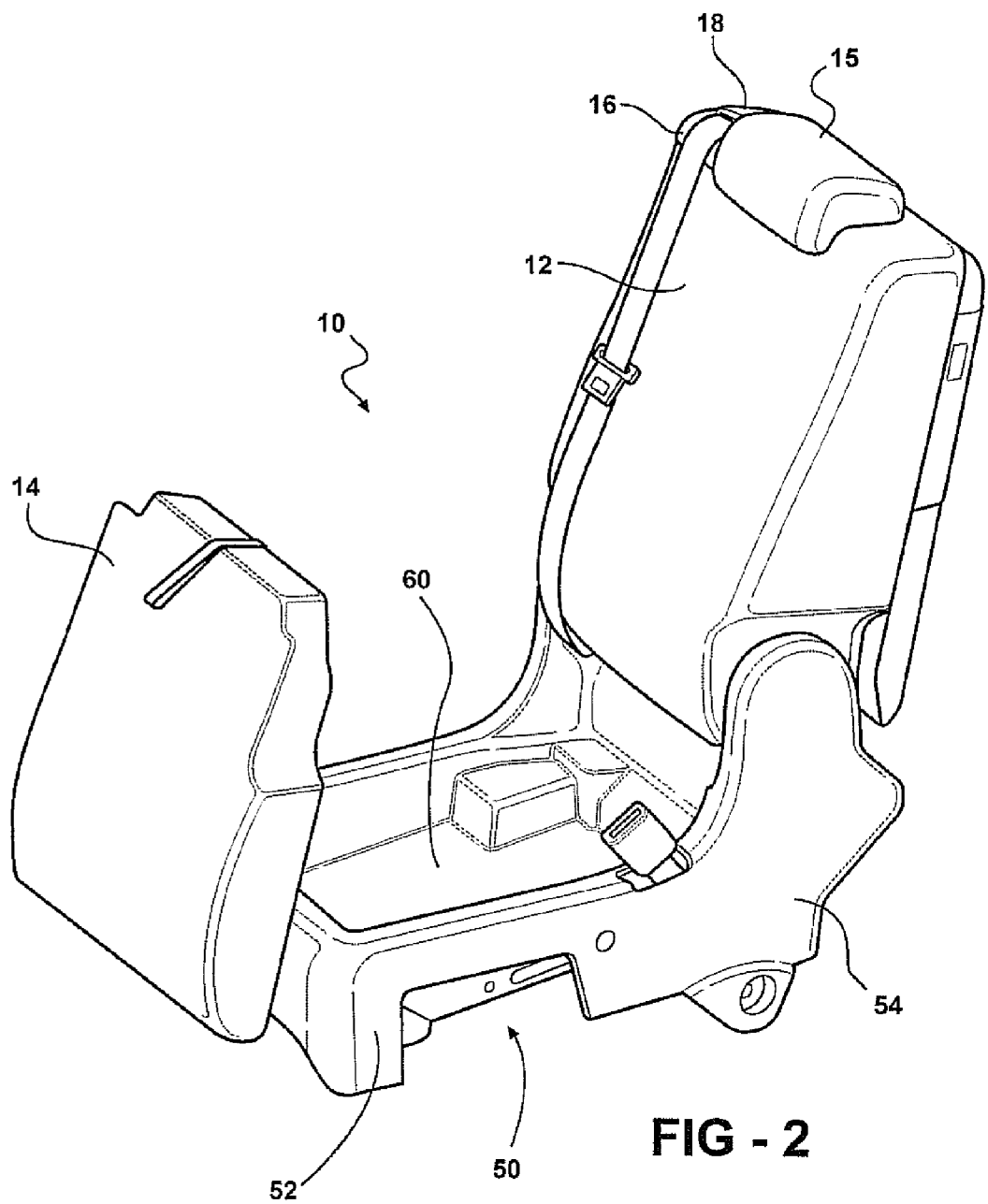
FIG. 2 is a front perspective view of the seat assembly with the seat cushion flipped upwardly to reveal a stowage compartment.
Figure 3:
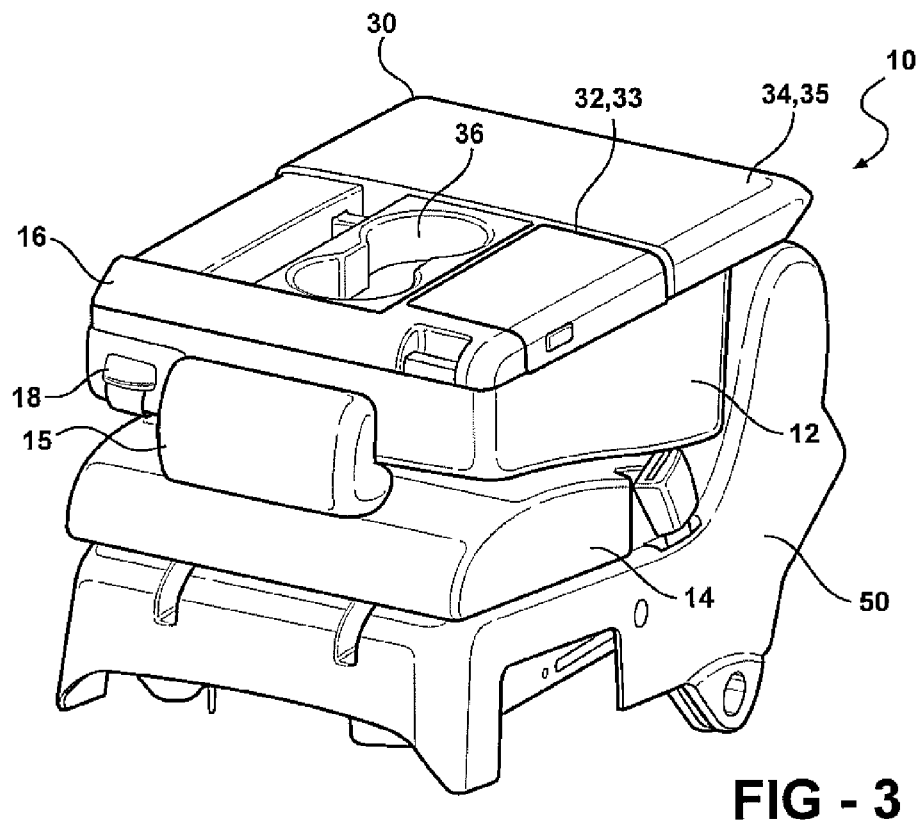
FIG. 3 is a front perspective view of the seat assembly with the seat back in a folded flat position.
Figure 4:
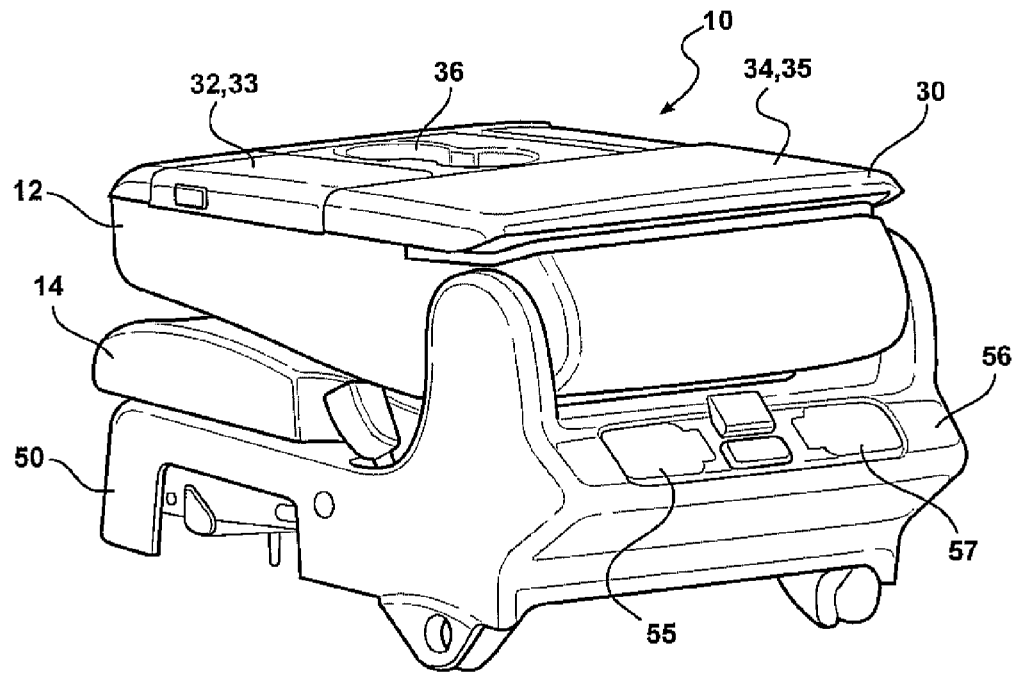
FIG. 4 is a rear perspective view of the seat assembly with the seat back in the folded flat position.
Figure 5:
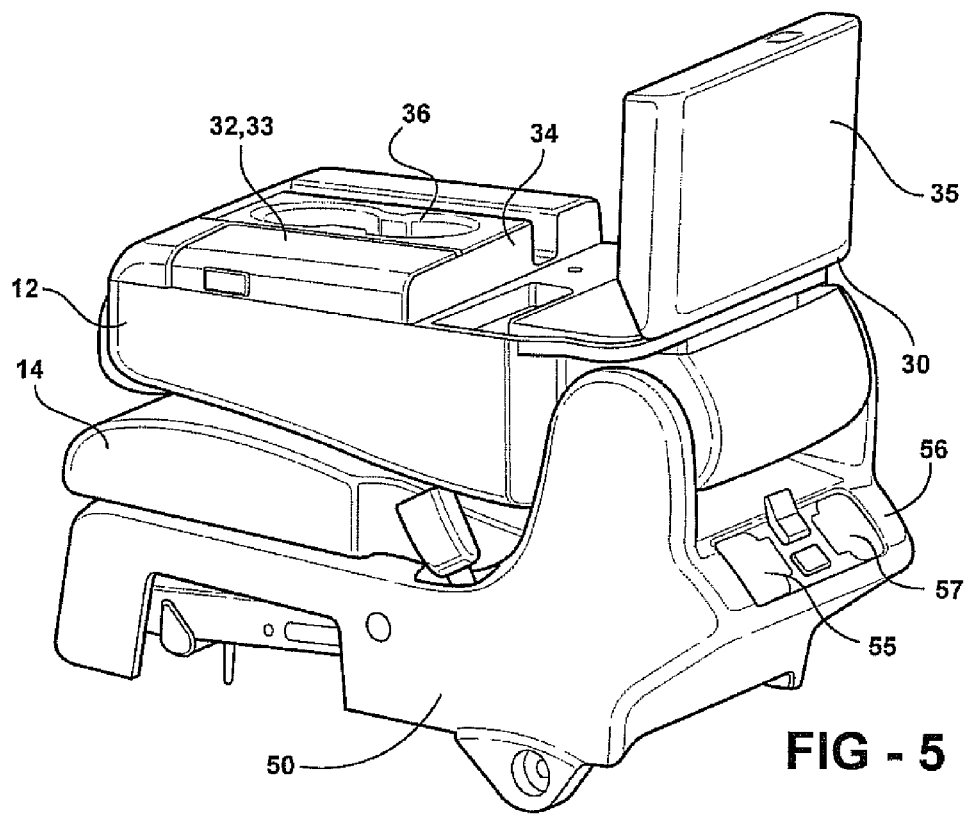
FIG. 5 is a side perspective view of the seat assembly with a first hinged lid covering a compartment on the back of the seat back.
Figure 6:
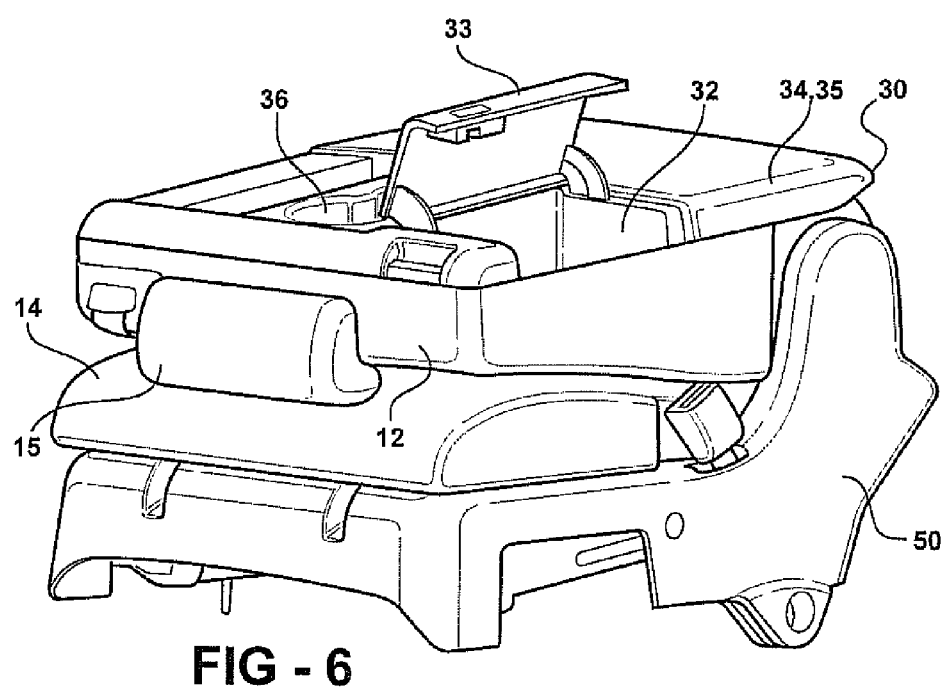
FIG. 6 is a front perspective view of the seat assembly with a second hinged lid covering a second compartment on the back of the seat back.

As shown in FIG. 2, the front end of the seat cushion 14 is pivotally coupled to the floor by a floor mounted adjuster mechanism 50 for movement of the seat cushion 14 between a generally horizontal seating position and an upright position. The seat cushion 14 is movable to the upright position to reveal a bin 60. The bin 60 is defined between upright risers 52, 54 of the adjuster mechanism 50, which are laterally spaced apart from each other. The adjuster mechanism may include a conventional track assembly that allows selective fore and aft adjustment of the seat along the floor of the vehicle.

A rear end of the adjust mechanism 50 includes a ventilation panel 56 having integrated registers 55, 57. The registers 55, 57 are in communication with the vehicle ventilation system for directing airflow therethrough. The registers 55, 57 direct airflow from the ventilation system toward occupants seated behind the seat assembly 10. The rear end may also include outlets for power (AC and/or DC), audio and video.

In one embodiment of the invention, the seat assembly 10 as described above is used as a front row seat disposed between front driver and passenger seats. The seat may occupy approximately 20% of the width of the entire front row of seats. Thus, the invention provides a front row center seat assembly that has a head restraint and that is usable as both a belt-integrated seat or a center console.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A vehicle front row center seat assembly for a vehicle with a ventilation system, the assembly comprising:

a seat cushion for a front row center seat;

a seat back for a front row center seat pivotally coupled to the seat cushion for movement between a generally upright seating position and a folded flat position overlying the seat cushion, the seat back adjustable between a plurality of seating positions and the folded flat position and having a front seating surface and an opposite back surface, the back surface having an integral console with a cup holder, a forward compartment and a rearward compartment, the forward compartment and rearward compartment each having a hinged lid for storing objects therein;

the rearward compartment extending along a width of the opposite back surface of the seat back;

a floor mounted adjust mechanism having a storage compartment disposed beneath the seat cushion and a ventilation panel with air registers, the air registers in communication with the ventilation system of the vehicle in order to direct airflow from the ventilation system to behind the seat assembly; and a three-point seat belt having an integrated tower, a belt retractor and a belt constraint, the integrated tower attached to the seat back and supporting the belt retractor, and the belt constraint extending from the belt retractor and having an end fixedly secured to the seat cushion;

the seat cushion pivotally movable relative to the seat back between a generally horizontal seating position and a generally upright open position, the generally upright open position allowing access to the storage compartment of the floor mounted adjust mechanism and placing the seat cushion generally parallel and spaced apart from the seat back in the generally upright seating position.

2. A vehicle seat assembly as set forth in claim 1, wherein the seat cushion pivots away from the seat back as it moves from the seating position toward the open position.

* * * * *